Sept. 4, 1956

M. W. MARIEN 2,761,748

SEALING RING ASSEMBLY

Filed Feb. 2, 1953

Inventor
MELVIN W. MARIEN by Hill, Sherman, Meroni, Gross & Simpson
Attys.

United States Patent Office 2,761,748
Patented Sept. 4, 1956

2,761,748

SEALING RING ASSEMBLY

Melvin W. Marien, Brentwood, Mo., assignor to Ramsey Corporation, St. Louis, Mo., a corporation of Ohio Application February 2, 1953, Serial No. 334,445

2 Claims. (Cl. 309—44)

This invention relates to sealing or packing ring assemblies utilizing pressure of the medium being sealed to maintain and assist formation of a good seal between relatively moving parts. Specifically, the invention deals with packing ring assemblies for pistons, shafts, and the like, wherein a plurality of cast iron or steel split rings are arranged with their gaps misaligned and in nested relationship so that pressure of the medium being sealed will act on one side face and upon a periphery of the assembly to maintain the assembly in sealing contact with a groove in which it is mounted and with a surface which it slidably engages.

The invention will hereinafter be specifically described in connection with split iron or steel piston type rings for forming seals for hydraulic pistons, shafts, and the like mechanical assemblies.

In accordance with this invention an axially outer split ring embraces an axially inner split ring and has the gap or split between the ends thereof misaligned from the gap or split between the ends of the inner ring. Another split ring covers a peripheral face of both rings and has its gap misaligned from the gaps in the other two rings. Preferably, the gaps are spaced apart substantially equally from each other. This assembly is inserted in a groove which is deeper and wider than the rings of the assembly so as to loosely receive the assembly therein. Pressure from the medium to be sealed is utilized to hold the assembly against one side face of the groove and to act upon either the inner or outer periphery of the groove for urging the assembly either inwardly against a shaft or outwardly against a cylinder wall depending on whether the assembly is of the contracting or expanding type. The third ring spans at least a portion of both the inner and outer rings and seals against leakage therebetween. Since the gaps of all of the rings are misaligned, flow from the high pressure to the low pressure side through the gaps is stopped.

The assemblies of this invention can be produced in a number of different forms and the rings, to provide the assemblies, can vary in shape, dimension, contour and resiliency to produce a desired net result in the assembly. For example, in some assemblies it will be desirable to exert a heavy pressure on the surface being sealed while in other assemblies a light pressure will suffice. In the preferred assemblies the sealing peripheries of the rings have contours to provide an initial quick wear in edge contact. This narrow band or line contact with the surface being sealed is quickly adapted to conform with irregularities in the surface and will quickly wear in to a good seating engagement with the surface which it seals.

It is then an object of this invention to provide packing assemblies of either the expanding or contracting types for effectively sealing relatively movable members without materially increasing the friction between the members.

A further object of this invention is to provide an all-metal packing ring seal which utilizes pressure of the medium being sealed for maintaining good sealing contact.

A still further object of this invention is to provide a packing ring assembly composed of split metal rings in nested and stacked relation with the gaps between their ends misaligned so as to prevent leakage therethrough.

A still further object of this invention is to provide a packing ring assembly wherein nested split rings receive on one peripheral face thereof another split ring and wherein all of the rings cooperate to provide a barrier against leakage.

A specific object of the invention is to provide a shaft seal wherein split metal rings are contracted by pressure of the medium being sealed in addition to their normal contracting resiliency.

Another object of this invention is to provide a packing ring assembly composed of split metal rings of either the expanding or contracting type and having the gaps between the ends of each split ring displaced relative to the gap in an adjoining ring so that leakage through the gaps will be stopped.

Other and further objects of this invention will be apparent to those skilled in the art from the following detailed description of the annexed sheets of drawings which, by way of preferred examples only, illustrates several embodiments of the invention.

The assembly is illustrative of relatively movable parts such as rotatable shafts and reciprocating pistons, sealed by packing ring assemblies of this invention against loss of pressure from a high pressure side $P_1$ to a low pressure side $P_2$. The seals in the top, middle and bottom grooves of multiple groove assemblies vary in their component ring construction but operate on the same principle. The ring constructions are varied to provide optimum sealing conditions at the various points being sealed. Thus, the top ring groove can receive relatively heavy cast iron rings to constitute the sealing assembly since this assembly may be subjected to the highest pressure, temperature or corrosion conditions in the assembly being sealed. The assembly in the middle groove can include steel and cast iron rings and may exert a lighter pressure on the surface being sealed. This middle groove assembly is only exposed to the leak-down from the assembly in the top ring groove and need not be so resistant to conditions to which the top ring assembly is fully exposed.

The bottom groove receives a ring assembly expressly adapted for sealing against outside conditions and may be designed to best meet those conditions.

Figure 1:
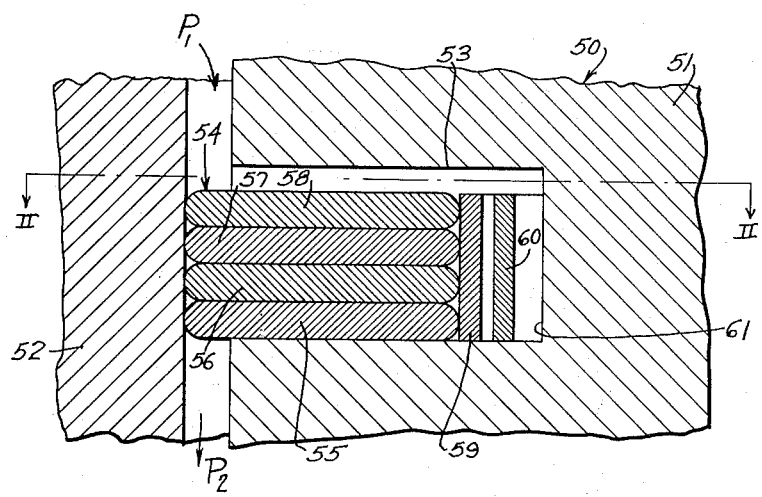
Figure 1 is an enlarged cross-sectional view of a ring assembly in a piston groove acting on a cylinder according to the invention and utilizing a stack of four ring segments backed by a sealing band and an expander.
Figure 2:
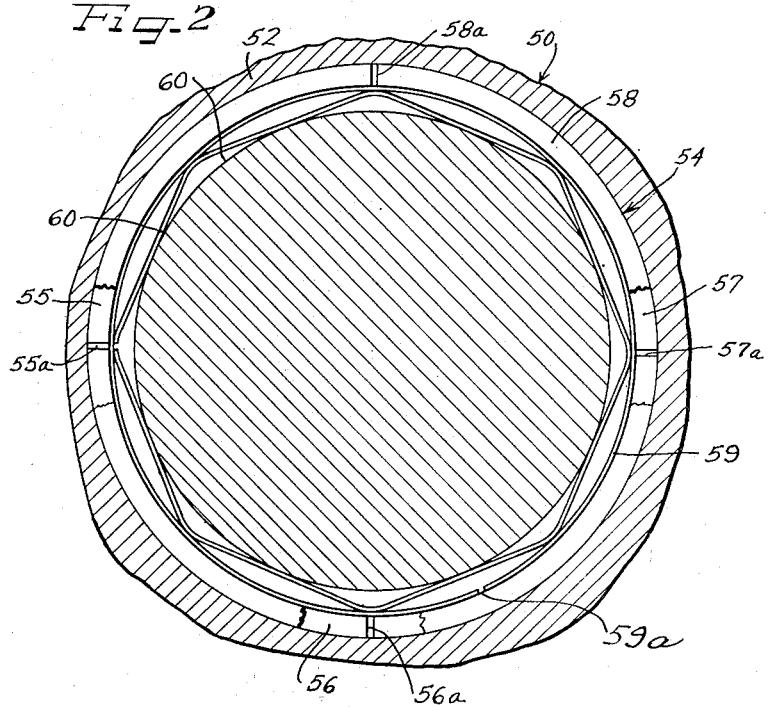
Figure 2 is a plan view of the assembly of Figure 1 with parts broken away to show underlying parts, and showing the piston and cylinder in horizontal section along the line II—II of Figure 1.

In the embodiment 50 of Figures 1 and 2, a piston 51 slidable in a cylinder 52 has a ring groove 53 receiving a ring assembly 54. This ring assembly 54 includes a stack of four split single type segment rings 55, 56, 57 and 58 around an upstanding thin sealing band 59 which is backed by an octagonal expansion spring ring 60. The segment rings have their gaps misaligned about 90° relative to each other, as shown at 55a, 56a, 57a and 58a in Figure 2. The gap 59a of the band 59 is misaligned from any of the other gaps and is preferably positioned midway between adjacent gaps.

The ring segments 55, 56, 57 and 58 have flat mating parallel faces with rounded inner and outer peripheries. The flat faces are pressed together in operation to form a flow barrier.

As shown in Figure 1, the bottom ring segment 55 rests upon the lower side wall of the piston ring groove 53 while the top ring segment 58 is spaced below the top of the ring groove. The four ring segments expand against the cylinder 52. Pressure $P_1$ acts against the top face of the top ring 58 thereby forcing the stack of rings against the lower side wall of the ring groove and at the same time forcing the mating faces of the ring segments into tight sealing compact. This pressure is diverted by the top face of the top ring segment 58 to the inner periphery of the assembly at the bottom of the ring groove and thereby becomes effective to force the ring segments against the cylinder wall 52 and to force the band 59 against the rounded inner peripheries of the ring segments. It will be noted that the ring segments have the same width with their rounded inner and outer peripheries in alignment so as to sealingly engage the cylinder wall 52 and the sealing band 59 respectively. The pressure $P_1$ at the bottom of the ring groove is also effective to tightly force the sealing ring 59 against the inner peripheries of the ring segments thereby creating seals at these inner peripheries.

As shown in Figure 1, the spring ring 60 compacts the sealing band 59 on its inner periphery at as many points as are provided on the ring. Between these points, the spring ring 60 engages the bottom of the piston ring groove as shown at 61. The spring ring is loaded between its points of contact with the sealing band and with the bottom of the ring groove and eliminates rotation between the relative parts of the assembly within the ring groove. In addition, of course, the spring ring holds the sealing band against the ring segments.

Since the sealing band 59 seals the gaps in the ring segments and since these gaps are positioned widely apart, leakage will not occur radially through the stack of ring segments.

If desired, the outer peripheries of the ring segments can be coated with a bearing material such as chromium.

The assembly of Figures 1 and 2 while shown as being mounted in the groove of a piston could also be mounted in the groove of a cylinder wall for acting on a shaft; the assembly may be of either the expanding type or the contracting type.

In view of the above descriptions it will therefore be understood that this invention provides a split metal ring assembly for forming seals for relatively rotating or sliding members. The assemblies are disposed in receiving grooves and are either contracted or expanded due to their own resiliency aided by the pressure of the medium being sealed. The gaps of the split rings are misaligned and a solid face of one ring always seals the gap of an adjacent ring so that leakage through the gaps is prevented.

It will be understood that modifications and variations may be effected without departing from the scope of the novel concepts of the present invention.

I claim as my invention:
1. A packing ring assembly for a peripheral groove in a piston of a piston and cylinder arrangement to provide an effective seal between the piston and the cylinder and to utilize fluid pressure therebetween to enhance the seal comprising; a plurality of thin split coaxial metal rings, a gap in each of said rings, said gaps being offset from each other, the total axial dimension of the thin rings substantially axially filling the axial dimension of the groove and being sufficiently less than the axial dimension of the groove whereby fluid pressure from between the piston and cylinder enters the groove to act in full force within the groove, a further metal ring continuously engaging the inner peripheries of the thin rings and having an axial dimension substantially the same as the total axial dimension of the thin rings, and an expander ring of substantially the same axial dimension as said further ring engaging said further ring radially inwardly thereof to exert expansion forces on said further ring and said thin rings.

2. A packing ring assembly for a peripheral groove in one of a pair of telescoping members to provide an effective seal between the members and to utilize fluid pressure therebetween to enhance the seal comprising; a plurality of thin split coaxial metal rings, a gap in each of said rings, said gaps being offset from each other, the total axial dimension of the thin rings substantially axially filling the axial dimension of the groove and being sufficiently less than the axial dimension of the groove whereby fluid pressure from between the members enters the groove to act in full force within the groove, a further metal ring continuously engaging the inner peripheries of the thin rings and having an axial dimension substantially the same as the total axial dimension of the thin rings, and an expander ring of substantially the same axial dimension as said further ring engaging said further ring radially inwardly thereof to exert expansion forces on said further ring and said thin rings.

References Cited in the file of this patent

UNITED STATES PATENTS

| Number | Name | Date |
| --- | --- | --- |
| 126,997 | Tetley et al. | May 21, 1872 |
| 490,913 | Lee | Jan. 31, 1893 |
| 602,328 | Holmes | Apr. 12, 1898 |
| 2,068,115 | Solenberger | Jan. 19, 1937 |
| 2,203,208 | Solenberger | June 4, 1940 |
| 2,294,177 | Halford | Aug. 25, 1942 |
| 2,443,853 | Fall | June 22, 1948 |
| 2,468,752 | Heinrich | May 3, 1949 |
| 2,468,980 | Huber | May 3, 1949 |